(12) United States Patent
McMullin et al.

(10) Patent No.: US 8,732,788 B2
(45) Date of Patent: *May 20, 2014

(54) INTEGRATED SET-TOP BOX

(75) Inventors: Donald G. McMullin, Laguna Hills, CA (US); Lawrence M. Burns, Los Altos, CA (US); Leonard Dauphinee, Irvine, CA (US); Ramon A. Gomez, San Juan Capistrano, CA (US); Loke Tan, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1452 days.

This patent is subject to a terminal disclaimer.

(21) Appl. No.: 11/133,237

(22) Filed: May 20, 2005

(65) Prior Publication Data
US 2006/0026661 A1    Feb. 2, 2006

Related U.S. Application Data

(60) Provisional application No. 60/572,783, filed on May 21, 2004.

(51) Int. Cl.
*H04N 7/16* (2011.01)

(52) U.S. Cl.
USPC ........... 725/151; 725/126; 725/127; 725/131; 725/134; 725/139

(58) Field of Classification Search
USPC .................. 725/126, 127, 151, 131, 139, 134
See application file for complete search history.

(56) References Cited

U.S. PATENT DOCUMENTS

| | | | |
|---|---|---|---|
| 4,006,420 A | 2/1977 | Schittko | |
| 4,162,452 A | 7/1979 | Ash | |
| 4,340,975 A | 7/1982 | Onishi et al. | |
| 4,352,209 A | 9/1982 | Ma | |
| 4,408,347 A | 10/1983 | Ash | |
| 4,408,349 A | 10/1983 | Yukawa | |

(Continued)

FOREIGN PATENT DOCUMENTS

| EP | 0473373 A2 | 3/1992 |
|---|---|---|
| WO | WO 00/76265 A1 | 12/2000 |

(Continued)

OTHER PUBLICATIONS

Ducourant et al., "A 3 Chip G&As Double Conversion TV Tuner System With 70 dB Image Rejection," *IEEE 1989 Microwave and Millimeter-Wave Monolithic Circuits Symposium*, pp. 87-90.

(Continued)

*Primary Examiner* — Jivka Rabovianksi
(74) *Attorney, Agent, or Firm* — Sterne, Kessler, Goldstein & Fox PLLC

(57) ABSTRACT

The present invention is an integrated set-top box. In one embodiment, the up-stream path and the down-stream path are integrated on a common semiconductor substrate. The down-stream path can include a TV tuner and a digital receiver portion that is integrated on the common semiconductor substrate with a power amplifier of the up-stream path. In another embodiment, the TV tuner is implemented on a first semiconductor substrate and the digital receiver portion and the power amplifier are configured on a second semiconductor substrate. However, the two substrates are mounted on a common carrier so that the set-top box appears to be a single chip configuration to the user.

19 Claims, 13 Drawing Sheets

(56) References Cited

U.S. PATENT DOCUMENTS

| | | | |
|---|---|---|---|
| 4,496,979 A | 1/1985 | Yu et al. | |
| 4,555,809 A | 11/1985 | Carlson | |
| 4,855,835 A | 8/1989 | Tobita | |
| 4,858,159 A | 8/1989 | Wheelwright et al. | |
| 5,020,147 A | 5/1991 | Okanobu | |
| 5,200,826 A | 4/1993 | Seong | |
| 5,321,852 A | 6/1994 | Seong | |
| 5,554,987 A * | 9/1996 | Ooga | 341/147 |
| 5,564,098 A | 10/1996 | Rodal et al. | |
| 5,568,512 A | 10/1996 | Rotzoll | |
| 5,584,066 A | 12/1996 | Okanobu | |
| 5,625,307 A | 4/1997 | Scheinberg | |
| 5,625,325 A | 4/1997 | Rotzoll et al. | |
| 5,692,279 A | 12/1997 | Mang et al. | |
| 5,734,589 A | 3/1998 | Kostreski et al. | |
| 5,737,035 A | 4/1998 | Rotzoll | |
| 5,739,730 A | 4/1998 | Rotzoll | |
| 5,757,220 A | 5/1998 | Murden et al. | |
| 5,790,946 A | 8/1998 | Rotzoll | |
| 5,822,687 A | 10/1998 | Bickley et al. | |
| 5,847,612 A | 12/1998 | Birleson | |
| 5,856,975 A | 1/1999 | Rostoker et al. | |
| 5,930,696 A | 7/1999 | Tzuang et al. | |
| 6,011,962 A | 1/2000 | Lindenmeier et al. | |
| 6,041,056 A | 3/2000 | Bigham et al. | |
| 6,163,684 A | 12/2000 | Birleson | |
| 6,177,964 B1 | 1/2001 | Birleson et al. | |
| 6,370,603 B1 | 4/2002 | Silverman et al. | |
| 6,377,315 B1 | 4/2002 | Carr et al. | |
| 6,438,123 B1 | 8/2002 | Chapman | |
| 6,484,042 B1 | 11/2002 | Loke | |
| 6,535,510 B2 | 3/2003 | Kalkunte et al. | |
| 6,707,861 B1 * | 3/2004 | Stewart | 375/321 |
| 6,757,909 B1 | 6/2004 | Maruo et al. | |
| 6,778,611 B1 | 8/2004 | Ungerboeck | |
| 6,807,193 B1 | 10/2004 | Beser | |
| 6,886,180 B1 | 4/2005 | Sandberg et al. | |
| 6,914,883 B2 | 7/2005 | Dharanikota | |
| 6,993,016 B1 | 1/2006 | Liva et al. | |
| 7,006,318 B2 | 2/2006 | Stence et al. | |
| 7,010,059 B2 * | 3/2006 | Song et al. | 375/316 |
| 7,017,176 B1 | 3/2006 | Lee et al. | |
| 7,113,484 B1 | 9/2006 | Chapman et al. | |
| 7,120,427 B1 * | 10/2006 | Adams et al. | 455/418 |
| 7,136,381 B2 | 11/2006 | Battle et al. | |
| 7,146,007 B1 | 12/2006 | Maruo et al. | |
| 7,207,106 B2 | 4/2007 | Abe et al. | |
| 7,245,638 B2 | 7/2007 | Agazzi et al. | |
| 7,305,222 B2 * | 12/2007 | Khorram | 455/333 |
| 7,327,726 B2 | 2/2008 | Kye | |
| 7,379,472 B2 | 5/2008 | Pantelias et al. | |
| 7,522,901 B2 | 4/2009 | Dauphinee | |
| 7,535,976 B2 | 5/2009 | Jaffee et al. | |
| 7,554,978 B1 | 6/2009 | Parker | |
| 7,847,864 B1 * | 12/2010 | Jaffe et al. | 348/724 |
| 2001/0053319 A1 | 12/2001 | Swanstrom et al. | |
| 2002/0065907 A1 | 5/2002 | Cloonan et al. | |
| 2002/0073431 A1 | 6/2002 | Nikolich | |
| 2002/0080898 A1 | 6/2002 | Agazzi et al. | |
| 2002/0093970 A1 | 7/2002 | Amit | |
| 2002/0106018 A1 * | 8/2002 | D'Luna et al. | 375/240.01 |
| 2002/0131426 A1 | 9/2002 | Amit et al. | |
| 2002/0176416 A1 | 11/2002 | Ben-Ze'ev et al. | |
| 2002/0188957 A1 | 12/2002 | Jantzi et al. | |
| 2003/0061623 A1 | 3/2003 | Denney et al. | |
| 2003/0181211 A1 * | 9/2003 | Razavilar et al. | 455/450 |
| 2004/0172658 A1 * | 9/2004 | Rakib et al. | 725/120 |
| 2004/0230997 A1 | 11/2004 | Kaylani | |
| 2005/0071882 A1 | 3/2005 | Rodriguez et al. | |
| 2005/0094714 A1 | 5/2005 | Robinson | |
| 2005/0123029 A1 * | 6/2005 | Vorenkamp et al. | 375/222 |
| 2005/0157818 A1 | 7/2005 | Dauphinee | |
| 2005/0226242 A1 | 10/2005 | Parker | |
| 2005/0262542 A1 | 11/2005 | DeWeese et al. | |
| 2005/0280742 A1 * | 12/2005 | Jaffe | 348/726 |
| 2006/0023813 A1 | 2/2006 | Jaffe et al. | |
| 2006/0026657 A1 | 2/2006 | Kuhlmann et al. | |
| 2006/0026659 A1 | 2/2006 | McMullin et al. | |
| 2006/0064583 A1 | 3/2006 | Birnbaum et al. | |
| 2006/0088056 A1 * | 4/2006 | Quigley et al. | 370/468 |
| 2006/0123457 A1 | 6/2006 | Chen et al. | |
| 2006/0203901 A1 | 9/2006 | Tan et al. | |
| 2007/0030806 A1 | 2/2007 | Pantelias et al. | |
| 2007/0214482 A1 | 9/2007 | Nguyen | |
| 2007/0291784 A1 | 12/2007 | Chan et al. | |
| 2007/0294738 A1 | 12/2007 | Kuo et al. | |
| 2008/0020797 A1 | 1/2008 | Denney et al. | |
| 2008/0198269 A1 | 8/2008 | Gomez | |

FOREIGN PATENT DOCUMENTS

| | | |
|---|---|---|
| WO | WO 01/17168 A2 | 3/2001 |
| WO | WO 01/74079 A1 | 10/2001 |
| WO | WO 02/47383 A1 | 6/2002 |

OTHER PUBLICATIONS

Farmer, "Specifications for Tuner Design for Use in Cable Ready Television Receivers and VCRs," *IEEE Transactions on Consumer Electronics*, vol. 36, No. 3, Aug. 1990, pp. 660-668.

Maas, "Microwave Mixers," Artech House, Copyright, 1986, pp. 248-251.

van Sinderen, J. et al., "A 48-860MHz digital cable tuner IC with integrated RF and IF selectivity", *Solid-State Circuits Conference*, 2003. Digest of Technical Papers. ISSCC. 2003 IEEE International, 2003, vol. 1, pp. 444-506, ISSN: 0193-6530.

van Sinderen, J. et al., "A 48-860MHz Digital Cable Tuner IC with Integrated RF and IF Selectivity", Power Point Slides from *International Solid-State Circuits Conference*, Feb. 2003, pp. 1-20.

Final Office Action for U.S. Appl. No. 11/133,275 mailed Feb. 6, 2009, 20 pages.

Final Office Action for U.S. Appl. No. 11/133,275 mailed May 4, 2010, 25 pages.

Non-Final Office Action for U.S. Appl. No. 11/133,275 mailed Jul. 15, 2011, 23 pages.

Non-Final Office Action for U.S. Appl. No. 11/133,275 mailed Jun. 11, 2008, 18 pages.

Non-Final Office Action for U.S. Appl. No. 11/133,275 mailed Oct. 13, 2009, 21 pages.

Droitcourt, J.L., "Understanding How Interactive Television Set Top Box Works . . . and What It Will Mean to the Customer," International Broadcasting Convention (Sep. 14-18, 1995, London, England), Conference Publication No. 413, pp. 382-394, IEE (1995).

"BCM 7110 Single-Chip Set-Top Box with DOCSIS 1.1 and PVR" [online], Product Brief, Broadcom Corporation (2002) [retrieved on Aug. 22, 2002]. Retrieved from the Internet: <URL: http://www.broadcom.com/products/7110.html> (2 pages).

"BCM 7110 Single-Chip Set-Top Box with DOCSIS 1.1 and PVR" [online], Broadcom Products Site Guide [retrieved on Aug. 22, 2002]. Retrieved from the Internet: <URL: http://www.broadcom.com/products/7110.html> (2 pages).

"BCM3345 High-Performance Single-Chip DOCSIS/EURODOCSIS Cable Modem" [online], Broadcom Products Site Guide [retrieved on Oct. 11, 2002]. Retrieved from the Internet: <URL: http://www.broadcom.com/products/3345.html>(2 pages).

"BCM3345 High-Performance Single-Chip DOCSIS/EURODOCSIS Cable Modem" [online], BCM3345 Product Brief, Broadcom Corporation (2002) [retrieved on Oct. 11, 2002]. Retrieved from the Internet: <URL: http://www.broadcom.com/products/3345.html> (2 pages).

"BCM3350 QAMlink Single-Chip Cable Modem" [online], Broadcom Products Site Guide [retrieved on Oct. 11, 2002]. Retrieved from the Internet: <URL: http://www.broadcom.com/products/3350.html> (2 pages).

"BCM3350 QAMlink Single-Chip Cable Modem" [online], BCM 3350 Product Brief, Broadcom Corporation (2001) [retrieved on Oct. 11, 2002]. Retrieved from the Internet: <URL: http://www.broadcom.com/products/3350.html> (2 pages).

(56) References Cited

OTHER PUBLICATIONS

"BCM3250 QAMLink Advanced Set-Top Box Single-Chip Front-End" [online], Broadcom Product Site Guide [retrieved on Oct. 11, 2002]. Retrieved from the Internet: <URL:http://www.broadcom.com/products/3250.html> (2 pages).

"BCM3250 QAMLink Advanced Set-Top Box Single-Chip Front-End" [online], BCM3250 Product Brief, Broadcom Corporation (2002) [retrieved on Oct. 11, 2002]. Retrieved from the Internet: <URL:http://www.broad.com.com/products/3250.html> (2 pages).

"High-Definition Video UMA Subsystem with 2D Graphics" [online], Broadcom Product Site Guide [retrieved on Oct. 11, 2002]. Retrieved from the Internet: <URL: http://www.broadcom.com/products/7020.html> (2 pages).

"High-Definition Video UMA Subsystem with 2D Graphics" [online], BCM7020R Products Brief, Broadcom Corporation (2002) [retrieved on Oct. 11, 2002]. Retrieved from the Internet: <URL: http://www.broadcom.com/products/7020.html> (2 pages).

Final Office Action for U.S. Appl. No. 11/133,275 mailed Oct. 24, 2011, 24 pages.

\* cited by examiner

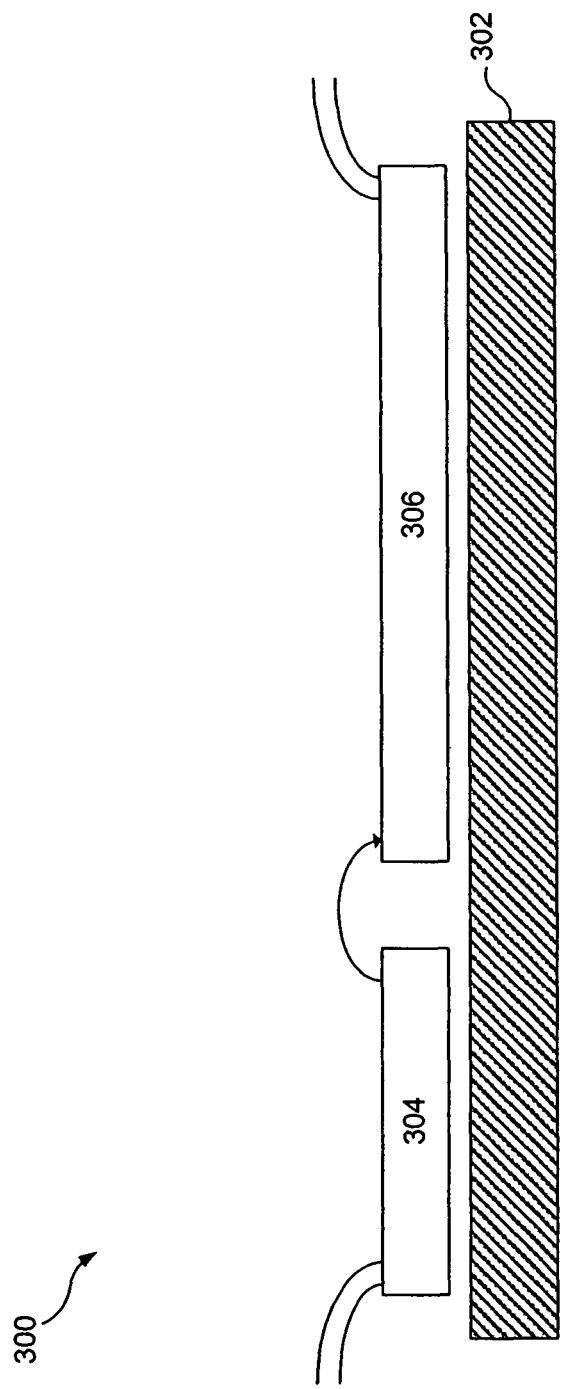

INTEGRATED SET-TOP BOX

CROSS REFERENCE TO RELATED APPLICATIONS

This Application claims the benefit of U.S. Provisional Application No. 60/572,783, filed on May 21, 2004, which is incorporated herein by reference in its entirety.

BACKGROUND OF THE INVENTION

1. Field of the Invention

The present invention generally relates to an integrated set-top box that is configured on a common integrated circuit (IC) substrate, such as a silicon substrate.

2. Background Art

Television signals are transmitted at radio frequencies (RF) using terrestrial, cable, or satellite transmission schemes. Terrestrial and cable TV signals are typically transmitted at frequencies of approximately 54 to 860 MHz, with 6 MHz channel spacings in the United States and 8 MHz channel spacings in Europe. Satellite TV signals are typically transmitted at frequencies of approximately 980 to 2180 MHz.

Regardless of the transmission scheme, a tuner is utilized to select and down-convert a desired channel from the TV signal to an intermediate frequency (IF) signal or a baseband signal, which is suitable for processing and display on a TV or computer screen. The tuner should provide sufficient image rejection and channel selection during down-conversion as is necessary for a specific application. Historically, the National Television Standards Committee (NTSC) sets standards for television signal transmission, reception, and display. To process an NTSC signal, it is preferable that the tuner have a high-level of image rejection. However, more or less image rejection can be required for non-NTSC signals depending on the specific application and the corresponding display requirements. The output of the tuner can be coupled to a cable modem or to an integrated set-top box.

Furthermore, in a cable modem or a set-top box, the up-stream path typically includes a power amplifier to amplify the up-stream signal from the user for transmission over the cable.

In conventional systems, both the tuner IC and the power amplifier IC are typically implemented on separate substrates from the digital portions of the cable modem IC or the set-top box IC. Therefore, a cable modem assembly typically includes at least 3 substrates, namely, the tuner IC, the power amplifier IC, and the cable modem IC.

What is needed is a single chip configuration for a cable modem or a set-top box so that the tuner and the upstream power amplifier are integrated with the digital portions of cable modem or the set-top box, so as to improve integration of the aforementioned ICs.

BRIEF SUMMARY OF THE INVENTION

The present invention is an integrated set-top box device. In one embodiment, the up-stream path and the down-stream path are integrated on a common semiconductor substrate The down-stream path can include a TV tuner and digital receiver portion that is integrated on a common semiconductor substrate with a power amplifier of the up-stream path.

In another embodiment, the TV tuner is implemented on a first semiconductor substrate and the digital receiver portion and the power amplifier are configured on a second semiconductor substrate. However, the two substrates are mounted on a common carrier so that the set-top box appears to be a single chip configuration to the user.

In one embodiment, the TV tuner is implemented using a quadrature direct down-conversion tuner that can down-convert the signal from RF to a low frequency IF or baseband. The quadrature direct conversion tuner also removes the need for an off-chip channel selection filter, because the down-conversion is directly to baseband without an intermediate frequency. The quadrature direct conversion tuner can also correct any in-phase/quadrature-phase (I/Q) errors between the in-phase and quadrature channels as well as any frequency errors using information provided from the receiver.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 3A-3C illustrates an integrated set-top box on a common carrier, according to embodiments of the present invention.

DETAILED DESCRIPTION OF THE INVENTION

Figure 1:
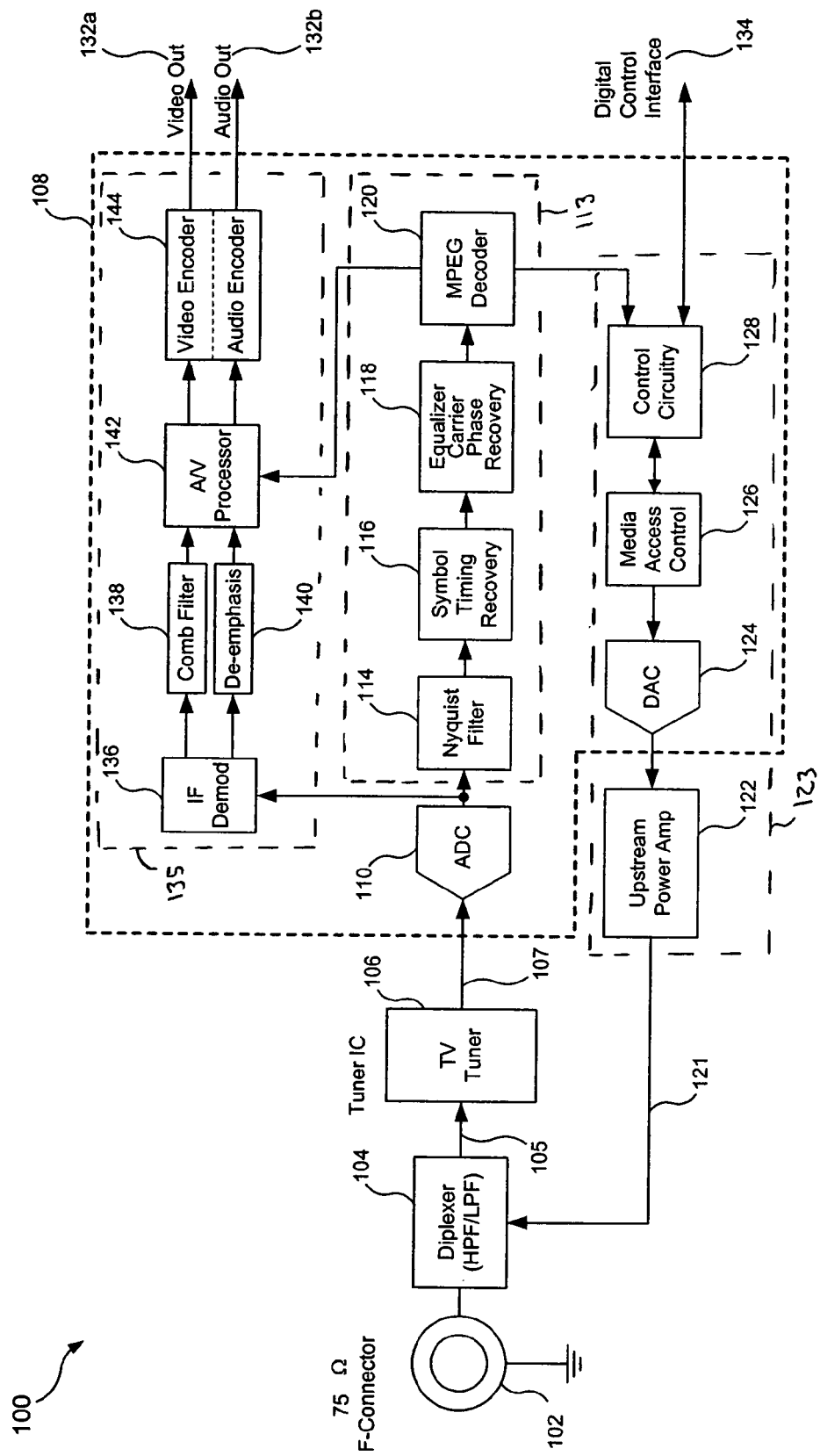
FIG. 1 illustrates a conventional set-top box.

FIG. 1 illustrates a schematic of a conventional set-top box assembly 100 that transmits and receives data over a cable system (e.g., a cable TV system). The set-top box 100 provides digital communications for the home user and/or cable TV reception for standard television programming. For example, the set-top box 100 provides TV video output 132a and audio TV output 132b, according to a number of formats. The set-top box may also provide communications through the digital control interface 134. For instance, the digital control interface 134 can be used for television or movie programming and selection, etc., including TiVo®-like or video on-demand applications.

The set-top box assembly 100 includes a diplexer 104, a tuner IC 106, and a set-top box IC 108. The diplexer 104 is connected to the cable 102 and separates a down-stream signal 105 from an up-stream signal 121. The down-stream signal 105 carries data and information (e.g., TV programming or internet service) from a cable head-end to the set-top box assembly 100. The up-stream signal 121 carries user data and information from the set-top box assembly 100 to the cable head-end. For instance, the up-stream signal 121 may include programming selection.

The tuner IC 106, an up-stream power amplifier 122, and the set-top box IC 108 are conventionally on separate integrated circuits. In other words, the tuner IC 106 and the power amplifier 122 are not conventionally integrated on the same substrate with the set-top box IC 108 due to size and complexity. Furthermore, the separate substrates make it easier to separate the analog functions of the tuner IC 106 and the power amplifier 122 from the digital functions of the set-top box IC 108, and therefore preclude interference.

During down-stream operation, the tuner 106 receives the down-stream signal 105 having multiple channels and down-converts a selected channel to an IF frequency, to produce an IF signal 107. For instance, the down-stream signal 105 can include multiple TV channels that typically have 6 MHz frequency spacings and cover a range of 54-860 MHz, and where a selected channel is down-converted to an IF frequency at 44 MHz, 36 MHz or some other desired IF frequency for further processing. The selected channel is then output as an IF signal 107 to the set-top box IC 108 for further processing. The frequencies listed herein are not meant as a limitation and are provided for example purposes only.

The down-stream path of the set-top box 108 includes an analog-to-digital converter (ADC) 110, a first digital receiver portion 113, and a second digital receiver portion 135. The first digital receiver portion 113 of the down-stream path is coupled to the output of the ADC 110 and includes a Nyquist filter 114, a symbol timing recovery circuit 116, an equalizer 118, and a Motion Picture Expert Group (MPEG) decoder 120. The second digital receiver portion 135 is also coupled to the output of the ADC 110 and includes an IF demod 136, a comb filter 138, a de-emphasis 140, an audio/video (A/V) processor 142, and a video-audio encoder 144 that produces the TV audio and video outputs 132a and 132b. The first digital receiver portion 113 provides digital signal demodulation, for example, Quadrature Amplitude Modulation (QAM), where the output of the MPEG decoder 120 is coupled to the A/V processor 142 for further processing. For example, further processing can include encoding and displaying an output of the MPEG decoder. The second digital receiver portion 135 supports NTSC demodulation and provides the audio and video outputs 132a and 132b for user display.

An up-stream path 123 of the set-top box 108 includes an up-stream power amplifier 122, a digital-to-analog converter (DAC) 124, a media access control (MAC) 126, and control circuitry 128.

During down-stream operation, the ADC 110 receives the IF signal 107 that is output from the tuner IC 106 and digitizes the IF signal 107. The elements of the first digital receiver portion 113 (the Nyquist filter 114, the symbol timing recovery 116, the equalizer 118, and the MPEG decoder 120) perform their respective signal processing functions, and output to the control circuitry 128 and the A/V processor 142. For example, the first receiver portion 113 could perform digital signal demodulation, including QAM demodulation, or some other type of demodulation. The output of the MPEG decoder 120 is further processed by the A/V processor 142 and the video-audio encoder 144 to generate the audio and video outputs 132a and 132b. In one embodiment, the output of the MPEG decoder 120 is further processed by the control circuitry 128 to communicate programming controls via the digital control interface 134.

Further, during down-stream operation, the output of the ADC 110 is also parallel processed by the second digital receiver portion 135 (having elements 136-144) to produce the standard video and audio TV outputs 132a and 132b. For example, standard NTSC signals can be processed and displayed using the second digital receiver portion 135.

For up-stream processing, the set-top box IC 108 receives transmit information from the user via the digital control interface 134. The control circuitry 128, the MAC 126 and the DAC 124 perform their respective signal processing prior to power amplification by the power amplifier 122 to produce the up-stream signal 121. As discussed above, it is noted that the up-stream power amplifier 122 is external to the set-top box IC 108 and therefore requires assembly.

Figure 2:
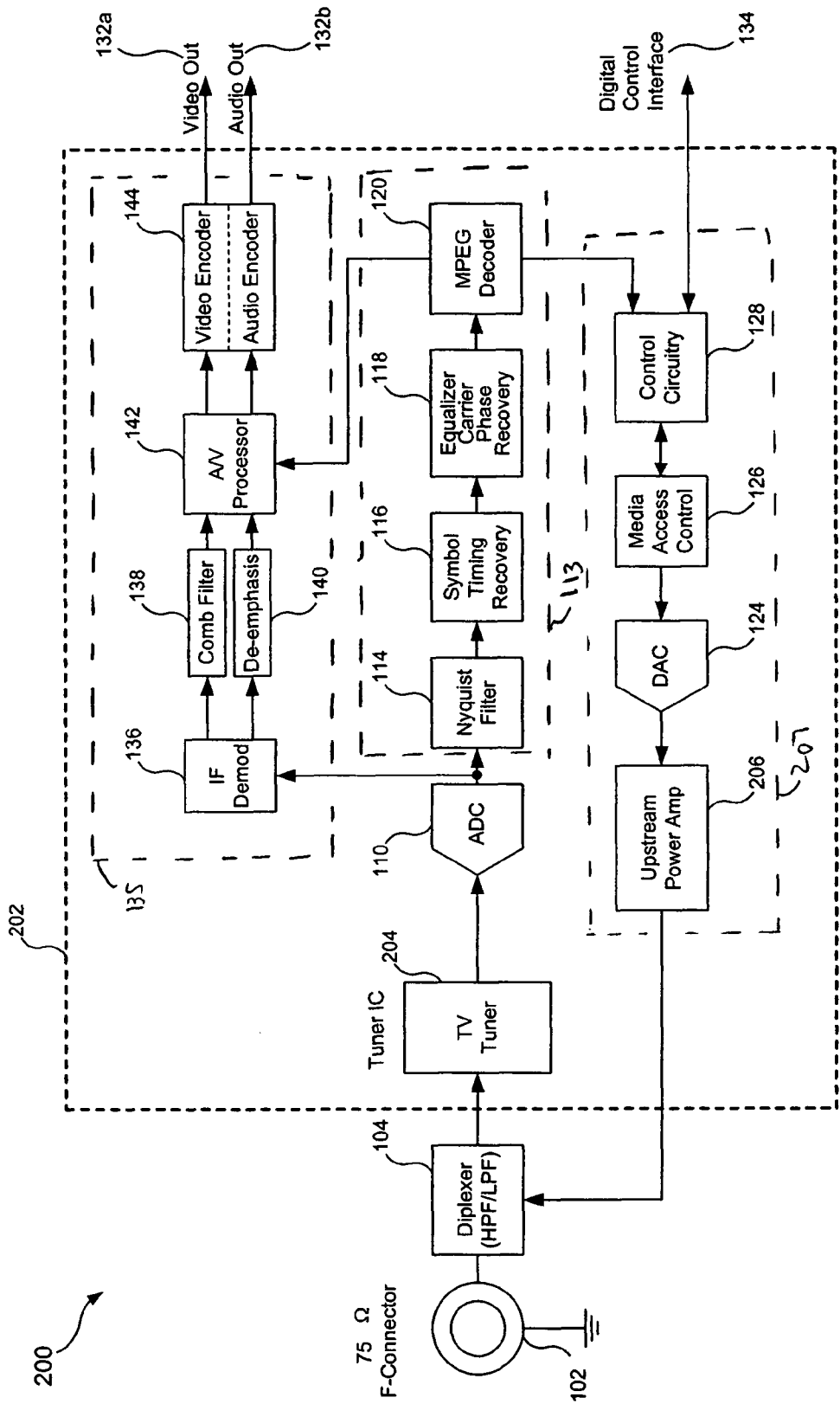
FIG. 2 illustrates an integrated set-top box according to embodiments of the present invention.

FIG. 2 illustrates a set-top box assembly 200 according to an embodiment of the invention. The set-top box assembly 200 includes the diplexer 104, and a set-top box IC 202. The set-top box IC 202 includes a TV tuner 204 and an up-stream power amplifier 206 that are integrated on a common substrate that defines the set-top box IC 202. For instance, the set-top box IC 202 is a common substrate (e.g., a silicon substrate) having the TV tuner 204 and the up-stream power amplifier 206 of an up-stream path 207 integrated with the set-top box digital functions that were illustrated in the IC 108.

There are numerous advantages to the single chip set-top box 200 shown in FIG. 2. Namely, there is no assembly needed to connect the power amplifier 206 and the TV tuner 204 to the digital functions of the set-top box IC 202. In other words, the high level of integration reduces or eliminates bond wire connections between the noted components. Bond wires and other inter-chip connections have electrical parasitics that reduce the performance of the set-top box tuner 100. Therefore, the single chip set-top box IC 202 has both performance as well as economic advantages over the configuration that was shown in FIG. 1.

Figure 3A:
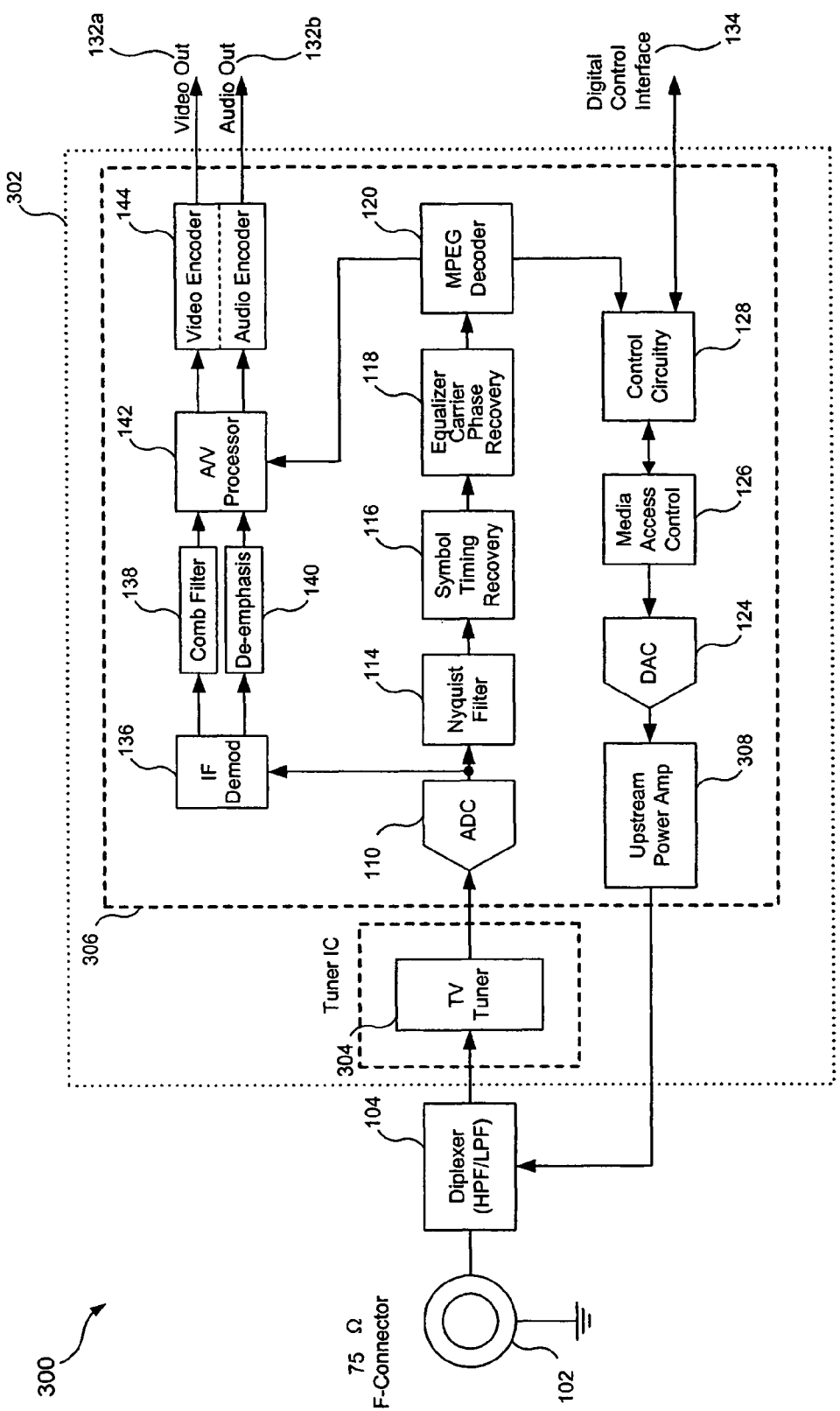

FIG. 3A illustrates a set-top box assembly 300 having a tuner IC 304 and a set-top box IC 306 that are mounted on a common carrier 302, according to an embodiment of the invention. The set-top box assembly 300 has a reduced level of integration relative to the set-top box 200, but this is not apparent to the end-user. Namely, the set-top box IC 306 includes an up-stream power amplifier 308 on the same substrate with the digital set-top box functions 110-144, similar to the set-top box IC 202. However, the tuner IC 304 is a separate substrate from that of the set-top box IC 306, but is mounted on the common carrier 302. The common carrier 302 can be made of fiberglass or FR-4, or some other type of known electronic PC board material. The common carrier 302 can be used to route signals between the various components of the set-top box assembly 300. For instance, the common carrier 302 can include conductive traces to route signals between the tuner IC 304 and the set-top box IC 306.

Figure 3C:
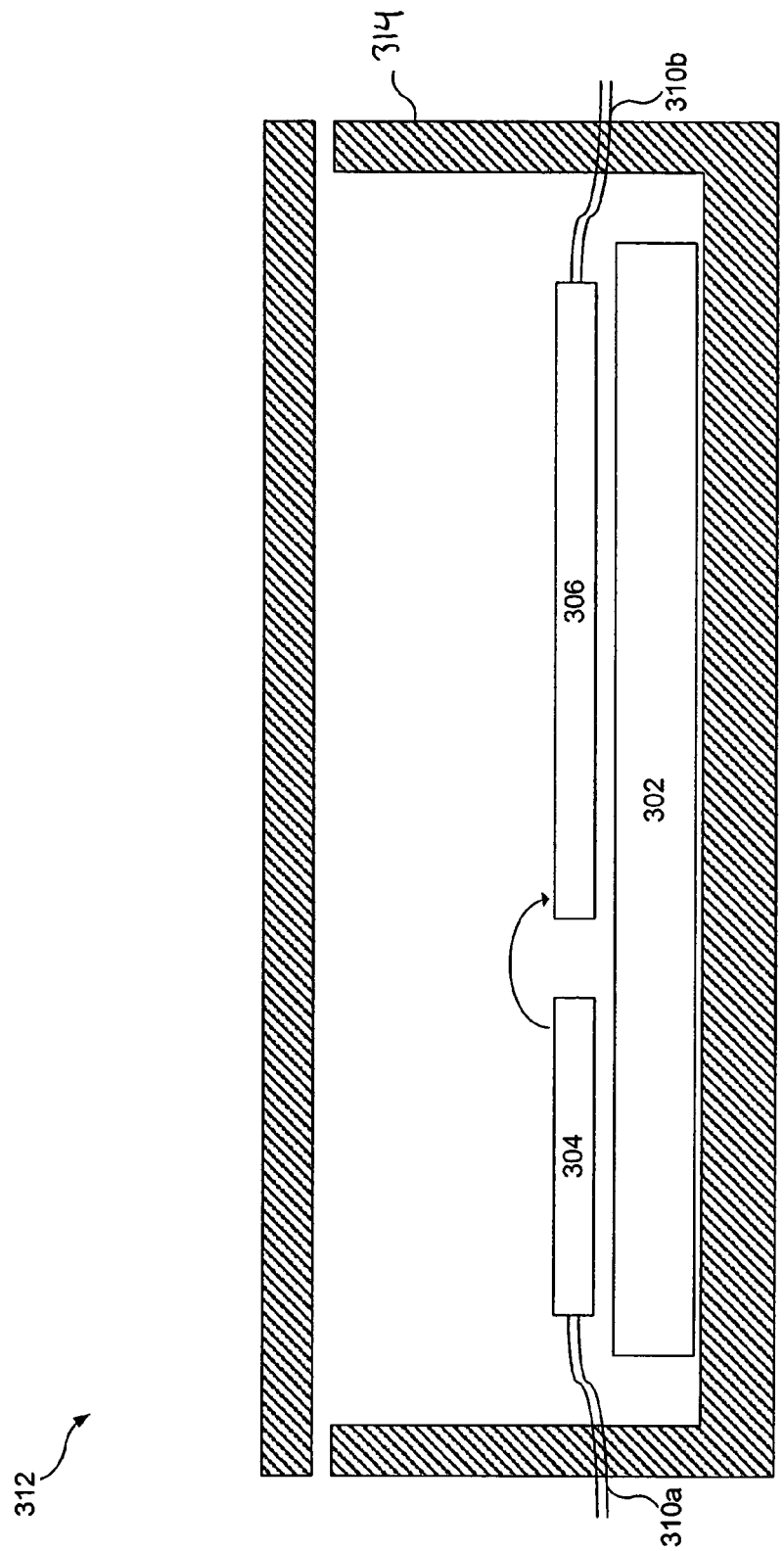

FIG. 3B further illustrates the set-top box 300. Namely, FIG. 3B illustrates a side view of the set-top box 300 with the TV tuner 304 and the set-top box IC 306 mounted on the common carrier 302. The TV tuner 304 and the set-top box IC 306 can be attached to the common carrier 302 using standard adhesive techniques that are used in the electronics industry. As shown in FIG. 3C, the common carrier 302 with the TV tuner 304 and the set-top box IC 306 can be mounted in a standard semiconductor package 314 (e.g., a plastic semiconductor package) with leads 310a and 310b extending through the plastic package 314. Once assembled, the set-top box 312 in FIG. 3C appears as a single chip device to a user, even though the tuner IC 304 is a separate IC from the set-top box IC 306.

Figure 4A:
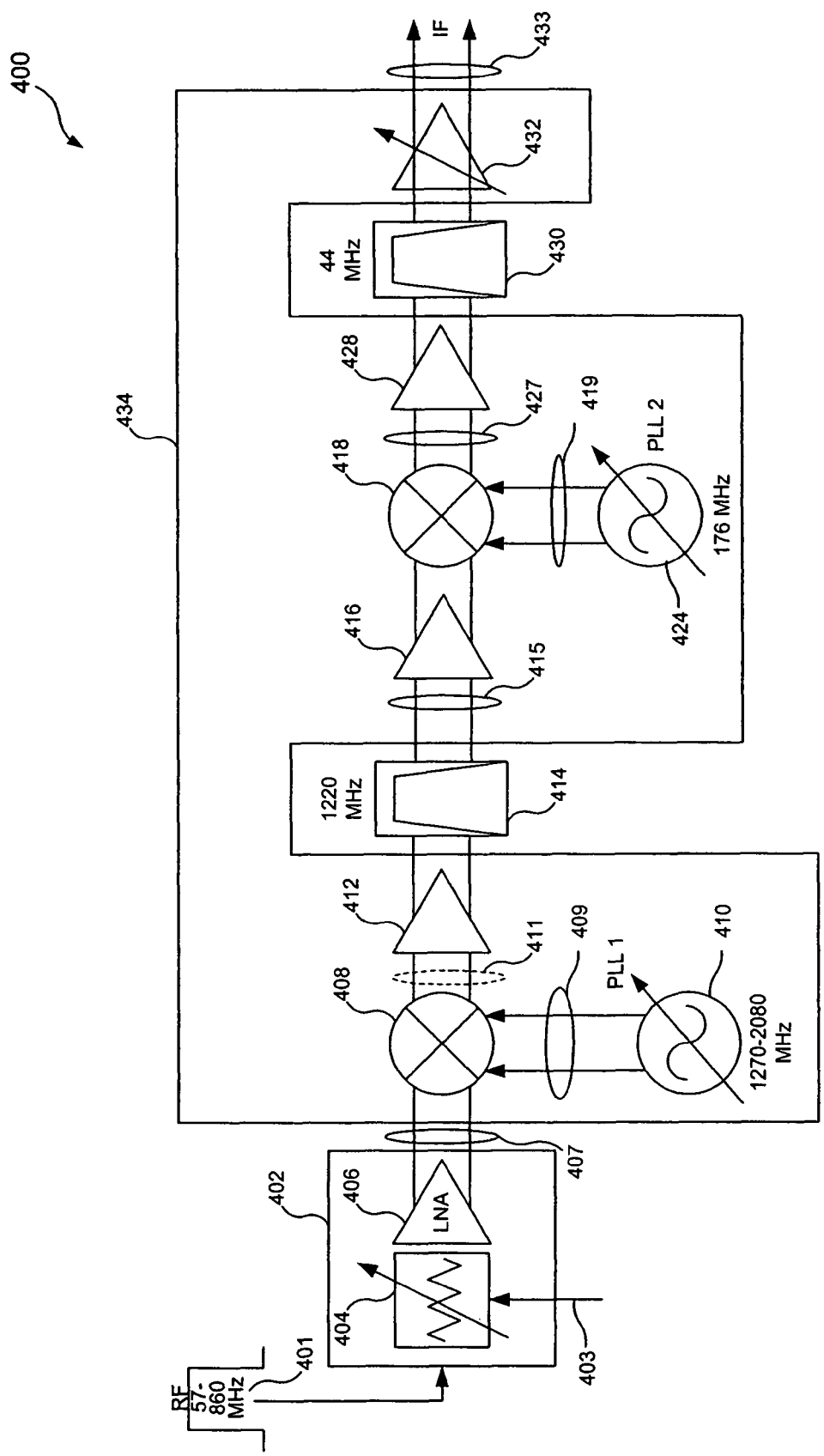
FIGS. 4A-4B illustrate a dual conversion tuner.

In one embodiment, the tuners 204 and 304 are a dual conversion tuner. For example, FIG. 4A illustrates a schematic of a tuner assembly 400 that has an (optional) automatic gain control circuit (AGC) 402 and a tuner 434. The optional AGC 402 can be on a separate substrate as shown or on a common substrate with the tuner 434, or the tuner 434 can be used without the AGC 402.

The tuner assembly 400 receives an RF input signal 401 having multiple channels and down-converts a selected channel to an IF frequency, to produce an IF signal 433. For instance, the RF input signal 401 can include multiple TV channels that typically have 6 MHz frequency spacings and cover a range of 54-860 MHz, and where the selected channel is down-converted to an IF frequency at 44 MHz, 36 MHz or some other desired IF frequency for further processing. The frequencies listed herein are not meant as a limitation and are provided for example purposes only. The structure and operation of the tuner assembly 400 are described in further detail below.

The AGC circuit 402 provides automatic gain control using a variable resistor network 404 and a low noise amplifier (LNA) 406. The variable resistor network 404 attenuates the RF input signal 401 according to a control signal 403. In embodiments, the control signal 403 is based on the signal amplitude of the IF signal 433, so that the RF front-end gain can be adjusted to achieve a desired amplitude for the IF signal 433. The LNA 406 provides low noise amplification and converts a single-ended input signal to a differential RF signal 407.

Tuner 434 is one embodiment of the tuner ICs 204 and 304 that are shown in FIGS. 2 and 3, respectively. The tuner IC 400 has a dual conversion architecture (one up-conversion, and one down-conversion) that includes an up-convert mixer 408 and a down-convert mixer 418. The up-convert mixer 408 is driven by a first phase-locked loop (PLL) 410 that has coarse tuning capability from 1270-2080 MHz. The down-convert mixer 418 is driven by a second PLL 424 that has a relatively fine tuning capability. Two separate off-chip surface acoustic wave (SAW) filters 414 and 430 are used to perform IF filtering in the tuner 434. However, other bandpass filters besides SAW filters could be used for the filters 414 and 430, as will be understood by those skilled in the arts. The first SAW filter 414 is connected between the up-convert mixer 408 and the down-convert mixer 418. The passband of the SAW filter 414 is centered at 1220 MHz, and is preferably only a few channels wide (e.g., 1-2 channels wide or 12 MHz for 6 MHz TV channel spacings), and can be referred to as a channel selection filter. The second SAW filter 430 has a passband at 44 MHz and is coupled to the output of the amplifier 428. Additionally, various on-chip amplifiers 412, 416, 428, and 432 are included throughout the tuner 434 to provide signal amplification, as necessary.

The SAW filters 414 and 430 could be implemented on the carrier 302 of the set-top box 300 that is shown in FIG. 3C. Alternatively, equivalent on-chip bandpass filters using lumped elements could be fabricated on-chip.

Figure 4B:
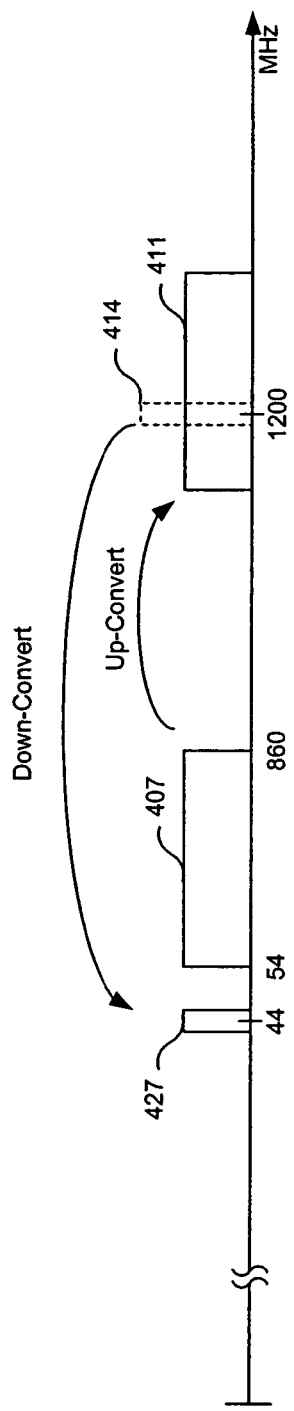

The operation of the tuner 434 is described as follows and in reference to FIG. 4B, where FIG. 4B represents the frequency spectrum of the particular signals that are operated on and generated by the tuner 434. The up-convert mixer 408 mixes the RF signal 407 with a LO signal 409 that is generated by the PLL 410. As discussed above and as shown in FIG. 4B, the RF signal 407 can be a TV signal having a plurality of channels that occupy a frequency range from 54 MHz to 860 MHz. Since the PLL 410 is tunable from 1270 to 2080 MHZ, the RF signal 407 is up-converted to a first IF 411 having a frequency that is above the 54-860 MHZ input frequency band. The first IF 411 is sent off-chip to the SAW filter 414, which has a narrow passband window centered at 1220 MHz, as discussed above. The first SAW filter 414 selects a desired channel 415 that is within its narrow passband window, and substantially rejects all of the remaining channels, including an image channel or frequency. Therefore, a particular channel is selected by varying the frequency of the LO signal 409 so that the desired channel is up-converted into the narrow passband of the IF filter 414. The desired channel 415 (at 1220 MHZ) is sent back on-chip to the PGA 416, where the PGA 416 provides gain for the selected channel 415. The down-convert mixer 418 mixes the output of the PGA 416 with an LO signal 419 from the PLL 424. The down-convert mixer 418 down-converts the desired channel 415 to a 44 MHz IF signal 427 that appears at the IF output of the down-convert mixer 418. Finally, the IF signal 427 is filtered a second time by the bandpass SAW filter 430 to reject any unwanted frequency harmonics, producing the output IF signal 433 at 44 MHz, or some other desired IF frequency or baseband, and carrying the information in the desired channel.

The specific frequencies mentioned in the description of the tuner assembly 400, and throughout this application, are given for example purposes only and are not meant to be limiting. Those skilled in the arts will recognize other frequency applications for the tuner assembly 400 based on the discussion given herein. These other frequency applications are within the scope and spirit of the present invention.

Furthermore, it is noted that the tuner assembly 400 is configured for differential operation. For instance, the first mixer 408, the bandpass filter 414, the second mixer 418, the first LO signal 409, and the second LO signal 419 are all configured with differential inputs and outputs to reduce signal distortion. However, the present invention is not limited to differential operation, and can be implemented in single ended configurations.

In another embodiment, the tuners 204 and 304 are implemented as a direct conversion digital tuner. For example, a direct sampling tuner includes a low noise amplifier (LNA) and an optional dynamically configurable band pass filter coupled to the low noise amplifier. The optional filter is configured to pass a selected band of channels. The tuner further includes a relatively high accuracy, multi-bit analog-to-digital converter ("ADC") coupled to the LNA or to the optional dynamically configurable band pass filter. The ADC operates at greater than twice a frequency of a sampled signal. The ADC directly samples the spectrum of the selected channels at the Nyquist frequency, thus avoiding image problems presented by conventional tuners. The direct conversion digital tuner is further described in U.S. application Ser. No. 10/952, 168, titled "Direct Digital Conversion Tuner and Method for Making the Same, filed on Sep. 29, 2004, which is incorporated herein by reference in its entirety. Furthermore, the high accuracy, multi-bit ADC is further described in U.S. patent application Ser. No. 10/085,071, which is incorporated herein by reference in its entirety.

In another embodiment, the tuners 204 and 304 are single conversion tuners that down-convert the RF input signal to an IF or a baseband signal that is then digitized. In yet another embodiment, the tuners 204 and 304 are quadrature direct conversion tuner that are capable of down-converting a quadrature signal directly to baseband and also performing A/D conversion and demodulation. The quadrature direct conversion tuner also removes the need for an off-chip channel selection filter, because the down-conversion is directly to baseband without an intermediate frequency. The quadrature direct conversion tuner can also correct any I/Q errors between the in-phase and quadrature channels, and also as any frequency errors.

Figure 5:
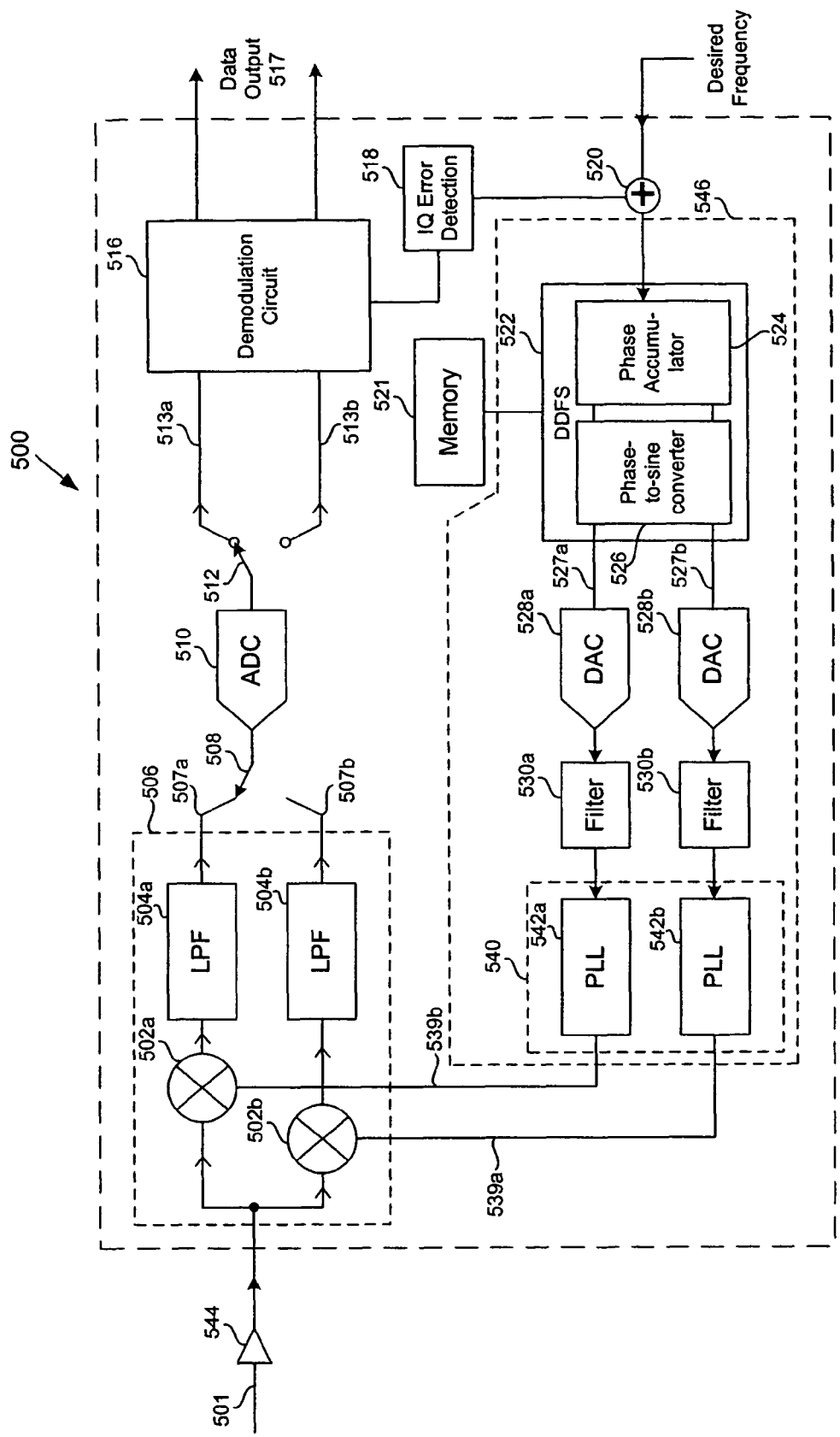
FIG. 5 illustrates a single conversion tuner having I/Q correction, according to embodiments of the present invention.

FIG. 5 illustrates a quadrature direct conversion tuner 500 in which quadrature components of a local oscillator signal are independently generated according to an embodiment of the present invention. The tuner 500 is one embodiment of the tuner that can be used in integrated set-top boxes 200 and 300. The tuner 500 includes a direct down conversion circuit 506, an analog-to-digital converter 510, a demodulation circuit 516, a memory 521, an I/Q Error Detection circuit 518, and a local oscillator circuit 546. The direct down-conversion circuit 506 includes quadrature mixers 502a and 502b, and lowpass filters 504a and 504b. The local oscillator circuit 546 includes: a DDFS 522 having and a phase accumulator 524 and a phase-to-sine converter 526, digital-to-analog converters 528a and 528b, filters 530a and 530b, and a PLL 540. A low noise amplifier 544 may be included off-chip, on a separate substrate.

During operation, the direct down conversion circuit 506 receives a RF input signal 501. The RF input signal 501 is generally amplified by the low-noise amplifier 544. For instance, a discrete low-noise amplifier, such as Broadcom part number BCM 3405, can be coupled to the input of the quadrature direct down conversion circuit 506. In an alternate embodiment, the amplifier 544 is integrated on-chip with the quadrature direct down-conversion circuit 506.

The mixers 502a and 502b mix the RF input signal 501 and a quadrature local oscillator signal 539 to provide a down-converted signal. More specifically, mixer 502a mixes the RF input signal 501 and a first quadrature component 539a of the local oscillator signal to provide a first down-converted quadrature component 507a. Mixer 502b mixes the RF input signal 501 and a second quadrature component 539b of the local oscillator signal to provide a second down-converted quadrature component 507b. The first and second quadrature components 507a and 507b can be at baseband or a low frequency IF depending on the operating frequency of the local oscillator. One or more low pass filters (LPFs) 504 can be included to reduce or eliminate unwanted signal energy.

A multiplexer 508 selects the first down-converted quadrature component 507a or the second down-converted quadrature component 507b to be sent to the analog-to-digital converter (ADC) 510. The receiver 500 includes a single ADC 510 for illustrative purposes, though the scope of the present invention is not limited in this respect. Separate ADCs could be used for the quadrature channels. However, a single ADC does not cause gain and/or linearity mismatches between the quadrature components that can occur when two ADCs are utilized. Further, a single ADC reduces the size of the tuner 500, as compared to using two ADCs.

The multiplexer 508 interleaves samples of the first down-converted quadrature component 507a and the second down-converted quadrature component 507b to provide an interleaved sample of the down-converted quadrature components to the ADC 510. In one embodiment, the multiplexer 508 toggles at a rate equal to at least twice the effective sampling rate of the ADC 510, so that both quadrature components can be adequately sampled. For example, sampling at this rate can facilitate accurate conversion of the down-converted quadrature components 507a and 507b by the ADC 510.

The ADC 510 converts the interleaved sampling of the down-converted quadrature components into a digital signal. According to an embodiment, the sampling rate of the ADC 510 equals the interleaving rate of the multiplexer 508 plus an over sampling ratio. By oversampling, the ADC 510 can extend the noise performance of the ADC 510 and/or reduce the number of bits required by the ADC 510.

A demultiplexer 512 de-interleaves the digital samples of the down-converted quadrature components provided by the ADC 510 to provide quadrature digital signals 513a and 513b. In an embodiment, the demultiplexer 512 toggles at a rate equal to the toggle rate of the multiplexer 508.

The demodulation circuit 516 receives quadrature digital signals 513a and 513b and provides a demodulated signal 517. The demodulated signal 517 is a data output that can be further processed for audio/video display, etc. In an embodiment, the demodulation circuit 516 is a quadrature amplitude modulation (QAM) demodulation circuit. For example, the demodulation circuit 516 can include a Nyquist filter, a variable rate symbol demodulator, an equalizer, and a carrier recovery loop (all not shown for convenience).

An I/Q error detection circuit 518 is coupled to the demodulation circuit 516 and determines an amplitude and/or phase error between the I and Q channels. The I/Q error detection circuit 518 can also include a carrier tracking loop that determines any frequency error in the down-converted signals 507a and 507b, which can then be corrected by the local oscillator circuit 546. The I/Q error detection circuit 518 forwards the I/Q error to a summer 520, which also receives a desired frequency for down-conversion. The desired frequency identifies the desired frequency or channel that is to be selected from the RF input signal 501. The local oscillator circuit 546 then sets the frequency of the local oscillator signal based on the selected channel of the RF input signal 501. The local oscillator circuit 546 also adjusts quadrature LO components 539a and 539b so as to correct any I/Q amplitude or phase errors, as discussed further below.

The local oscillator circuit 546 includes a Direct Digital Frequency Synthesizer (DDFS) 522 and a memory 521 to generate a digital representation of the local oscillator signal. The memory 521 stores a read-only memory (ROM) lookup table. The ROM lookup table includes a plurality of entries, where each entry represents a phase of the local oscillator signal or a sine or cosine thereof. The DDFS 522 can retrieve an entry from the ROM lookup table at each cycle or half-cycle of the VCO clock, for example, to provide the digital representation of the local oscillator signal.

The DDFS 522 generates a digital sinewave having I Q components based on the desired channel input from the summer 520. The DDFS 522 digitally converts phase information relating to the local oscillator signal to a digitized sinusoidal waveform. The DDFS 522 receives the phase information from the memory 521. The DDFS 522 provides faster frequency switching, lower phase noise, and/or higher frequency resolution, as compared to standard phase-locked loop (PLL) frequency synthesizers.

The DDFS 522 includes a phase accumulator 524 to receive phase information relating to the local oscillator signal with each successive clock cycle of the local oscillator circuit 546. For example, the phase accumulator 524 can receive first phase information during a first clock cycle, and second phase information during a second clock cycle, and so on.

The DDFS 522 further includes a phase-to-sine converter 526 to convert phase information received from the memory 521 into a digitized sinusoidal waveform. For example, the phase-to-sine converter 526 can provide a first waveform representing the sine of the phase information and a second waveform representing the cosine of the phase information. The first waveform is a first quadrature component 527a of the local oscillator signal, and the second waveform is a second quadrature component 527b of the local oscillator signal, wherein the first and second components are digital representations of the local oscillator signal.

According to another embodiment, the memory 521 also stores a frequency offset value. For example, the offset value can indicate a difference between the actual frequency of the local oscillator signal and the desired frequency of the local oscillator signal. The frequency of the local oscillator signal can be set based on the offset value. For instance, the offset value can be combined with the local oscillator signal to provide a frequency-shifted local oscillator signal.

The memory 521 can also store a phase offset that indicates a phase difference between quadrature components of the local oscillator signal, determined by the demodulation circuit 516, for example. The offset value can be used to adjust the phase of at least one of the quadrature components of the local oscillator signal. Utilizing the offset value to correct the phase difference between the quadrature components of the local oscillator signal can eliminate the need for other quadrature correcting circuitry or software. For example, correcting the quadrature of the local oscillator signal using the DDFS 522 can reduce the number of components needed in the receiver 500, thereby reducing the cost of the receiver in an embodiment.

In summary, the quadrature components of the local oscillator signal are generated independently in accordance with the embodiment shown in FIG. 5. Therefore, the DDFS 522 reduces any gain mismatch or phase mismatch between the quadrature components.

The frequency of the local oscillator signal can be based on a frequency control word associated with the local oscillator signal. For instance, a clock signal can be multiplied by the frequency control word to calculate the frequency of the local oscillator signal. The offset value stored in the memory 521 can be used to calculate the frequency control word associated with the local oscillator signal. In an embodiment, the offset value is used to set the frequency of at least one of the quadrature components of the local oscillator signal.

According to another embodiment, the receiver 500 includes two DDFSs. For instance, a first DDFS can be used to convert phase information relating to a first quadrature component of the local oscillator signal to a first digitized sinusoidal waveform. The second DDFS can be used to convert phase information relating to a second quadrature component of the local oscillator signal to a second digitized sinusoidal waveform.

The digital representations 527 of the local oscillator quadrature components are provided to digital-to-analog converters (DACs) 528. The DACs 528 can convert the digital representations into analog local oscillator signals. For instance, the DACs 528 can directly generate the analog local oscillator signals. Alternatively, the DACs 528 can generate reference signals, which can be used by phase-locked loops (PLLs), such as PLLs 542, to generate the analog local oscillator signals 539a and 539b as shown in FIG. 5.

Filters 530 are coupled to the output of the DACs 528 so as to reduce or eliminate unwanted frequencies from the quadrature local oscillator signals. The filters 530 can be low pass filters or bandpass filters. According to an embodiment, the filters 530 are narrow-band bandpass filters. For direct conversion, the filters 530 can be set at a particular frequency or range of frequencies that represents the desired channel of the RF input signal. In a first embodiment, the passband of the filters 530 are tunable and set based on the frequency of the local oscillator signal set by the local oscillator circuit 546. In a second embodiment, the passband of the filters 530 are set at a predetermined frequency or range of frequencies, and the local oscillator circuit 546 manipulates the frequency of the local oscillator signal to be within the passband of the filters 530. For example, the local oscillator circuit 546 can multiply the frequency of the local oscillator signal by a factor based on the selected channel of the RF input signal 501.

Phase Lock Loops (PLL) 542 are coupled to the outputs of the filters 530, and provide the quadrature components 539a and 539b of the local oscillator signal to the direct down conversion circuit 506 to be mixed with the RF input signal 501. A PLL 542 is included for each quadrature component of the local oscillator signal. However, a single PLL can be used to filter both quadrature components.

The PLLs 542 can multiple the frequency of the local oscillator signal by a predetermined factor. For example, the PLL 542 can multiply the frequency of the local oscillator signal by a factor in the range from approximately two to approximately thirty. Other factors could be used. The PLLs 542 can increase the frequency of the local oscillator signal by a factor of six in a set-top box system, for example. The PLLs 542 can increase the frequency of the local oscillator signal by a factor of twelve in a satellite communication system, to provide another example.

Using the PLLs 542 to multiply the frequency of the local oscillator signal by a fixed value allows the DACs 528 to sample at a lower rate. For example, the sampling rate of the DACs 528 is decreased by a factor that is proportional to the factor by which the frequency of the local oscillator is multiplied in an embodiment. Using the PLLs 528 to multiply the frequency of the local oscillator signal by a fixed value can enable the size of the PLLs 528 to be reduced, as compared to the situation in which the PLLs 528 are used to multiply the frequency of the local oscillator by a variable factor to generate the frequency of the local oscillator signal.

According to an embodiment of the present invention, the direct down conversion circuit 506, the demodulation circuit 516, and the local oscillator circuit 546 are on a common substrate. One or more of the multiplexer 508, the ADC 510, the demultiplexer 512, the DAC 528, the memory 521, I/Q correction circuit 518, and the filters 530 can be on the common substrate, as well. Combining elements, such as those mentioned above, on a common substrate reduces the cumulative circuit area required by the elements, and therefore the overall chip cost.

The quadrature direct conversion tuner 500 is further described in U.S. patent application Ser. No. 10/902,477, titled "Apparatus and Method for Integration of Tuner Functions in a Digital Receiver, which is incorporated by reference herein in its entirety.

Figure 6:
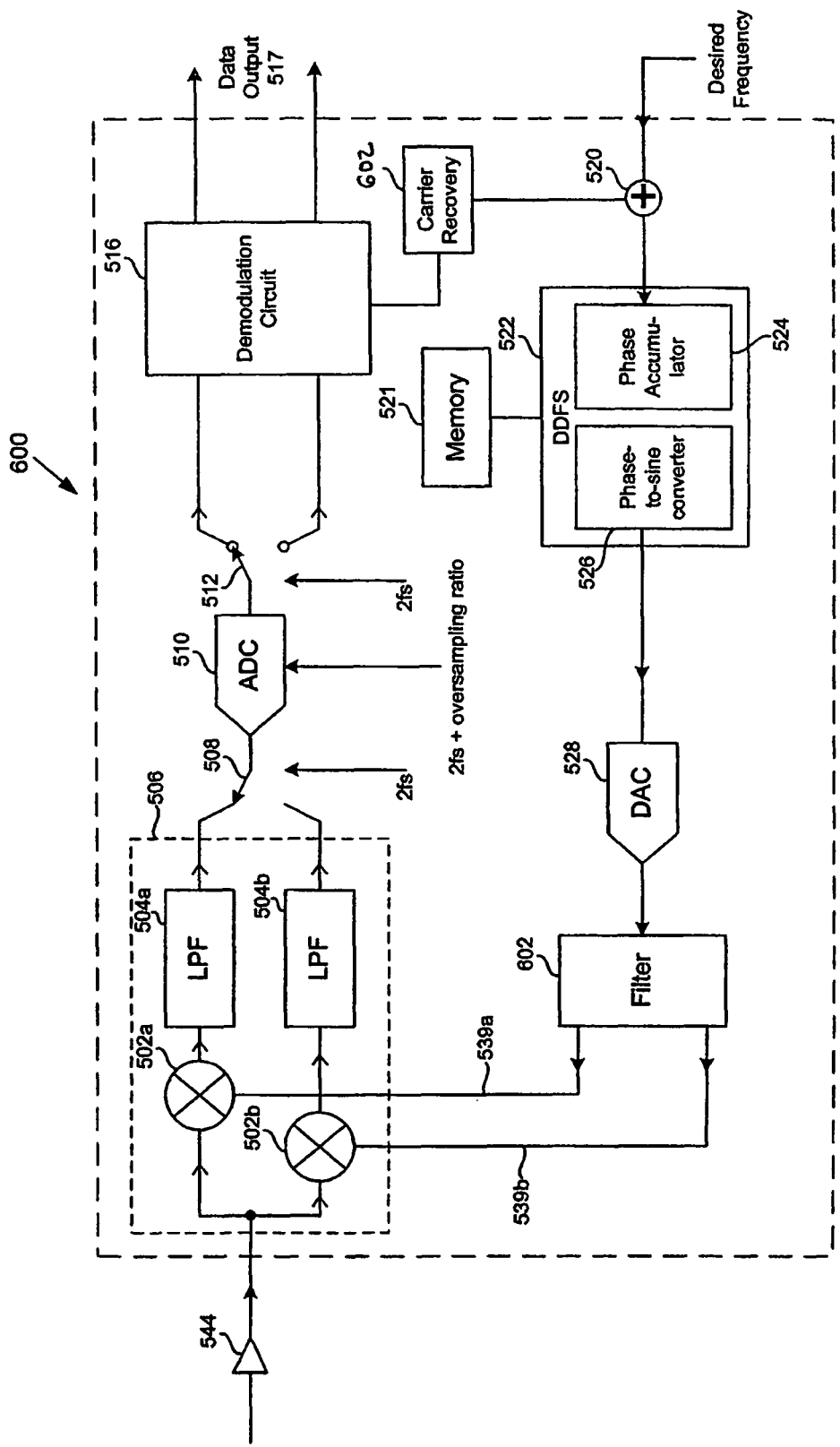
FIG. 6 illustrates a single conversion tuner having frequency correction, according to embodiments of the present invention.

FIG. 6 illustrates a further tuner embodiment 600, that uses a single DAC 528, and a carrier recovery loop 602 instead and an I/Q error detection circuit. The carrier recovery loop 602 determines any frequency offset between the I/Q channels. Accordingly, the tuner 600 is only capable of making frequency corrections to the local oscillator signals 539 and cannot make I/Q phase corrections. However, the signal DAC 528 utilizes less substrate area.

As discussed above in reference to FIG. 3A, the up-stream power amplifier is also integrated on chip. The integration of the up-stream power amplifiers 206 and 308 are further described in U.S. patent application Ser. No. 10/163,313, which is incorporated by reference herein in its entirety. For example, an up-stream amplifier is integrated on a substrate with a digital-to-analog converter (DAC). In an embodiment, a low-pass filter is also integrated on the substrate. The output signal level of the up-stream amplifier is controllable. In embodiments, fine adjustments are made to the output signal level of the up-stream amplifier by varying a bias current of the DAC. A software control bit is used to switch between a power-on mode of operation and a power-down mode of operation. The up-stream amplifier transmits in a burst mode. The power consumption of the up-stream amplifier scales with the amplifier's output signal level. A high degree of matching is attained between the positive and negative paths of the up-stream amplifier. This provides high immunity from common-mode disturbances such as substrate noise, clock spurs, and glitches caused by a gain change.

Figure 7:
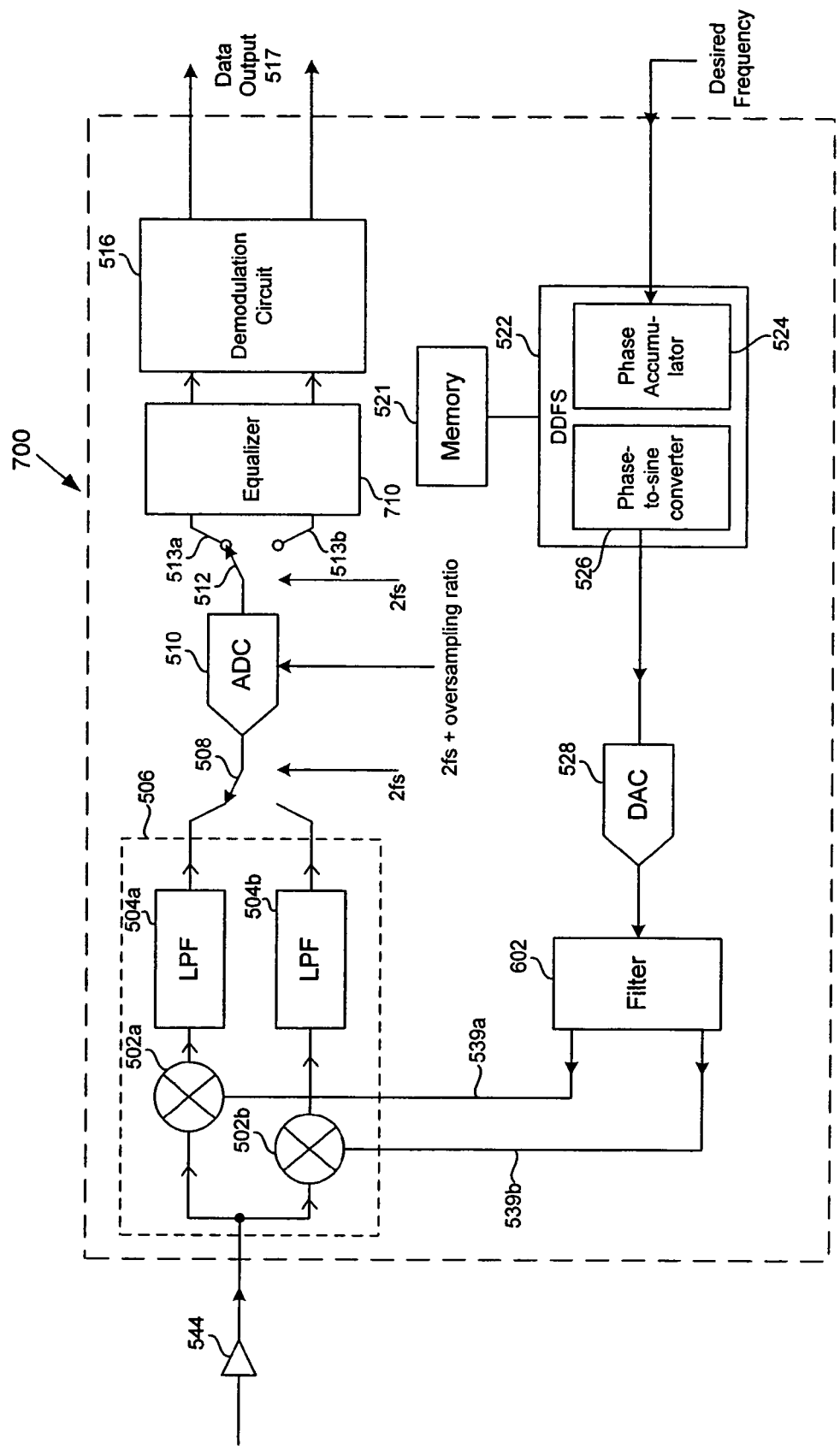
FIG. 7 illustrates a direct conversion tuner having IQ correction using an equalizer circuit.

FIG. 7 illustrates a quadrature direct conversion tuner 700 having a baseband equalizer 710 according to an embodiment of the present invention. In embodiments, the baseband equalizer 710 is a asymmetric equalizer that is used to correct IQ errors.

Quadrature paths of the tuner 700 are generally not completely isolated from each other. For instance, a first quadrature component traveling along a first path 513a can include information from a second quadrature component traveling along a second path 513b, and vice versa. The baseband equalizer 710 can determine how much information from one quadrature component is included in the other quadrature component, and vice versa. The baseband equalizer 710 generally subtracts the second quadrature component information or a portion thereof from the first quadrature component. The baseband equalizer 710 typically subtracts the first quadrature component information or a portion thereof from the second quadrature component.

Figure 8:
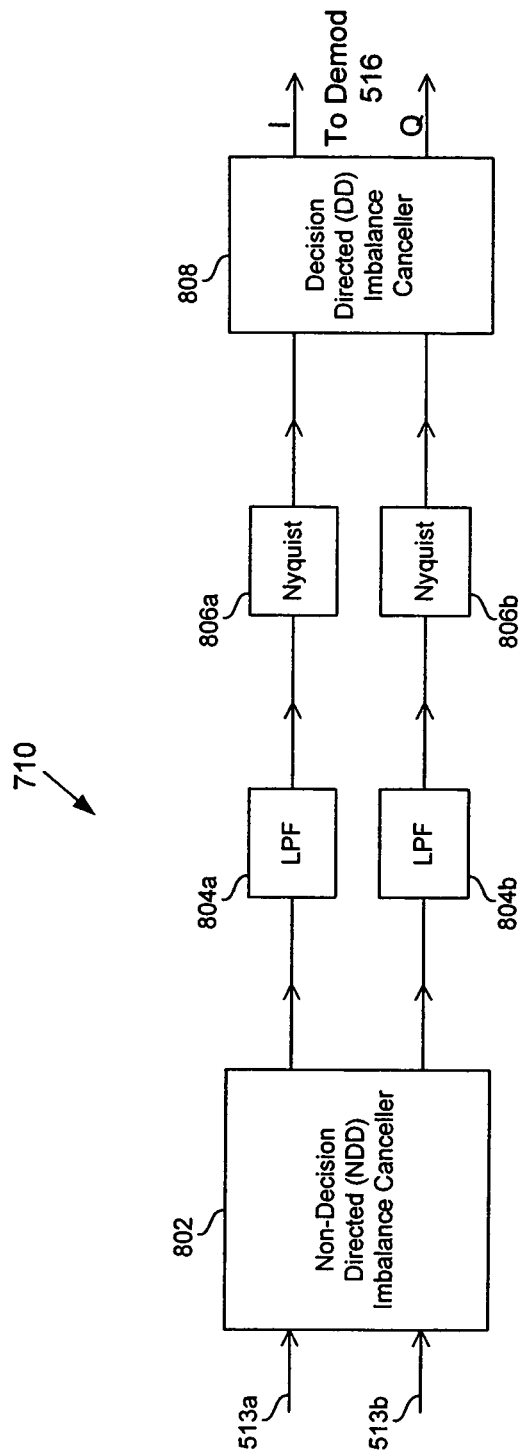
FIG. 8 illustrates first embodiment of the equalizer used in the direct conversion tuner, the equalizer having a non-decision directed stage and a decision directed stage.

FIG. 8 further illustrates the baseband equalizer 710. Referring to FIG. 8, the equalizer 710 is a two stage equalizer having a non-decision directed (NDD) imbalance canceller 802, low pass filters 804, Nyquist filters 806, and a decision directed (DD) imbalance canceller 808. In embodiments, the NDD imbalance canceller 802 is a DC IQ Imbalance Canceller that corrects for gain and phase imbalance. Whereas, the DD imbalance canceller 808 is an asymmetric equalizer that corrects for any type of IQ imbalance, including sampling imbalance. In an example, the equalizer includes an NDD portion that receives an output of an A/D converter, and a DD portion coupled to an output of the NDD portion.

The equalizer 710 is further described in U.S. Provisional Patent Application No. 60/661,165, filed on Mar. 14, 2005, which is incorporated herein by reference.

Figure 9:
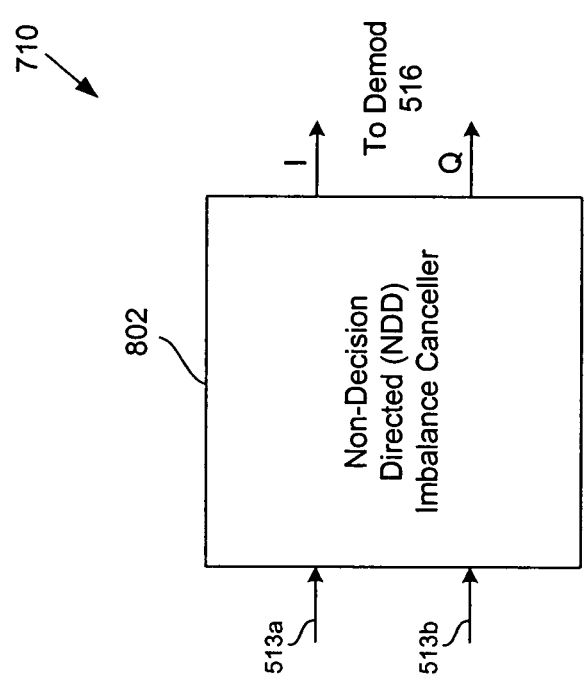
FIG. 9 illustrates a second embodiment of the equalizer used in the direct conversion tuner, the equalizer having only a non-decision directed stage.

FIG. 9 illustrates a second embodiment of the equalizer 710, the equalizer having only the non-decision directed stage 802. The IQ imbalance correction is still accomplished with the NDD imbalance canceller 802.

Figure 10:
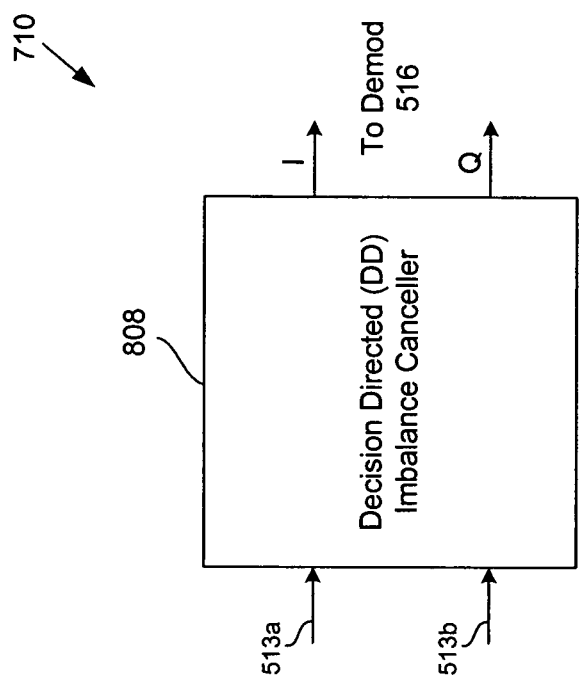
FIG. 10 illustrates a third embodiment of equalizer used in the single conversion tuner, the equalizer having only a decision directed stage.

FIG. 10 illustrates a third embodiment of equalizer 710, the equalizer having only a decision directed stage 808. The IQ imbalance correction is still accomplished with the DD imbalance canceller 808.

Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. An integrated set-top box, comprising:
    a common semiconductor substrate;
    a down-stream path disposed on said common semiconductor substrate configured to down-convert a radio frequency (RF) signal, including:
        a down-conversion circuit configured to produce a down-converted signal;
        an analog-to-digital converter (ADC), coupled to an output of said down-conversion circuit, configured to digitize said down-converted signal;
        a first demodulation circuit, coupled to an output of said ADC, configured to demodulate said digitized down-converted signal using a first demodulation method, wherein said first demodulation circuit includes a Motion Picture Expert Group (MPEG) decoder;
        a second demodulation circuit, coupled to said output of said ADC, configured to demodulate said digitized down-converted signal using a second demodulation method, wherein said second demodulation circuit comprises:
            an Audio/Video (A/V) processor configured to receive an input from said MPEG decoder,
            a video encoder coupled to a first output of said A/V processor, and
            an audio encoder coupled to a second output of said A/V processor; and
    an upstream power amplifier disposed on said common semiconductor substrate.

2. The integrated set-top box of claim 1, further comprising:
    a multiplexer coupled between said output of said down-conversion circuit and an input of said ADC.

3. The integrated set-top box of claim 1, further comprising:
    a demultiplexer coupled between said output of said ADC and an input of said first demodulation circuit.

4. The integrated set-top box of claim 1, further comprising:
    an in-phase/quadrature-phase (I/Q) Error Detection circuit configured to determine an I/Q error of said down-converted signal.

5. The integrated set-top box of claim 4, further comprising:
    a local oscillator circuit configured to generate a quadrature local oscillator signal based on an output of said I/Q error detection circuit.

6. The integrated set-top box of claim 5, wherein said local oscillator circuit is configured to correct any I/Q phase imbalance determined by said I/Q error detection circuit.

7. The integrated set-top box of claim 5, wherein said local oscillator circuit comprises:
    a direct digital frequency synthesizer (DDFS) configured to produce a digital representation of said quadrature local oscillator signal; and
    a pair of digital-to-analog converters (DACs) that are coupled to quadrature outputs of said DDFS.

8. The integrated set-top box of claim 7, wherein said local oscillator circuit comprises:
    a pair of low pass filters (LPFs) coupled to corresponding outputs of said pair of DACs; and
    a Phase-Locked Loop (PLL), coupled to said outputs of said pair of DACs, said PLL being configured to multiply a frequency of said outputs of said pair of DACs to produce said quadrature local oscillator signal.

9. The integrated set-top box of claim 7, further comprising:
    a memory coupled to said DDFS.

10. The integrated set-top box of claim 9, wherein said DDFS comprises:

a phase accumulator configured to receive phase information relating to said quadrature local oscillator signal with each successive clock cycle of said local oscillator circuit; and a phase-to-sine converter configured to convert said phase information received from said memory into a digitized sinusoidal waveform.

11. The integrated set-top box of claim 1, wherein said MPEG decoder is configured to generate an MPEG output from said digitized down-converted signal, and wherein said second demodulation circuit is configured to generate an A/V output from said MPEG output.

12. The integrated set-top box of claim 1, wherein said first demodulation circuit comprises:
   a nyquist filter coupled to said output of said ADC;
   a symbol timing circuit coupled to an output of said nyquist filter; and
   an equalizer coupled to an output of said symbol timing circuit and said MPEG decoder.

13. The integrated set-top box of claim 1, wherein said second demodulation circuit comprises:
   an IF demodulator coupled to said output of said ADC;
   a comb filter coupled to an output of said IF demodulator; and
   a de-emphasis module coupled to said output of said IF demodulator.

14. The integrated set-top box of claim 13, wherein said A/V processor is coupled to an output of said first demodulation circuit, an output of said comb filter, and an output of said de-emphasis module.

15. The integrated set-top box of claim 1, wherein said first demodulation method is quadrature amplitude demodulation, and wherein said second demodulation method is National Television System Committee (NTSC) demodulation.

16. The integrated set-top box of claim 1, wherein said second demodulation circuit is further configured to extract an audio and video output from said input.

17. The integrated set-top box of claim 16, wherein said A/V processor is configured to extract said audio and video output from said input.

18. An integrated set-top box, comprising:
   a common semiconductor substrate;
   a down-stream path disposed on said common semiconductor substrate configured to down-convert a radio frequency (RF) signal, said down-stream path including:
      a tuner configured to down-convert said RF signal; and
      a down-conversion circuit configured to produce a down-converted signal;
      a first demodulation circuit configured to demodulate said down-converted signal using a first demodulation method, wherein said first demodulation circuit includes a Motion Picture Expert Group (MPEG) decoder configured to generate an MPEG output;
      a second demodulation circuit configured to demodulate said down-converted signal using a second demodulation method, wherein said second demodulation circuit comprises:
         an Audio/Video (A/V) processor configured to directly receive said MPEG output from said MPEG decoder,
         a video encoder directly coupled to a first output of said A/V processor, and
         an audio encoder directly coupled to a second output of said A/V processor; and
   an upstream power amplifier disposed on said common semiconductor substrate.

19. An integrated set-top box, comprising:
   a common semiconductor substrate;
   a down-stream path disposed on said common semiconductor substrate configured to down-convert a radio frequency (RF) signal, said down-stream path including:
      a quadrature down-conversion circuit configured to produce a quadrature down-converted signal by mixing said RF signal with a quadrature local oscillator signal; and
      a first demodulation circuit configured to demodulate said quadrature down-converted signal using quadrature amplitude demodulation, wherein said first demodulation circuit includes a Motion Picture Expert Group (MPEG) decoder configured to generate an MPEG signal;
      a second demodulation circuit, configured to demodulate said quadrature down-converted signal using National Television System Committee (NTSC) demodulation, wherein said second demodulation circuit comprises:
         a comb filter;
         a de-emphasis module;
         an Audio/Video (A/V) processor coupled to an output of said first demodulation circuit, an output of said comb filter, and an output of said de-emphasis module, wherein said A/V processor is configured to receive said MPEG signal from said MPEG decoder,
         a video encoder coupled to a fist output of said A/V processor, and
         an audio encoder coupled to a second output of said A/V processor; and
   an upstream power amplifier disposed on said common semiconductor substrate.

* * * * *